US008687627B2

(12) United States Patent
Tanaka

(10) Patent No.: US 8,687,627 B2
(45) Date of Patent: Apr. 1, 2014

(54) COMMUNICATION APPARATUS

(75) Inventor: Shingo Tanaka, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 65 days.

(21) Appl. No.: 13/365,925

(22) Filed: Feb. 3, 2012

(65) Prior Publication Data

US 2012/0177048 A1   Jul. 12, 2012

Related U.S. Application Data

(63) Continuation of application No. PCT/JP2009/003744, filed on Aug. 5, 2009.

(51) Int. Cl.
*H04L 12/50* (2006.01)

(52) U.S. Cl.
USPC .......................................... 370/360; 370/382

(58) Field of Classification Search
USPC .......... 370/360–366, 380–383, 386, 389, 392
See application file for complete search history.

(56) References Cited

U.S. PATENT DOCUMENTS

| 4,890,280 | A | 12/1989 | Hirata | |
|---|---|---|---|---|
| 2006/0098648 | A1* | 5/2006 | Fukunaga et al. | 370/389 |
| 2007/0195767 | A1* | 8/2007 | Yonemoto et al. | 370/389 |
| 2008/0279188 | A1* | 11/2008 | Alfieri et al. | 370/392 |
| 2009/0248891 | A1 | 10/2009 | Tanaka | |
| 2009/0262739 | A1* | 10/2009 | Lu | 370/392 |

FOREIGN PATENT DOCUMENTS

| JP | 55-71339 | 5/1980 |
|---|---|---|
| JP | 63-18900 | 1/1988 |
| JP | 1-231452 | 9/1989 |
| JP | 2-1669 | 1/1990 |
| JP | 5-14409 | 1/1993 |
| JP | 6-224932 | 8/1994 |
| JP | 7-38569 | 2/1995 |
| JP | 10-55326 | 2/1998 |
| JP | 2000-69043 | 3/2000 |
| JP | 2001-285395 | 10/2001 |
| JP | 2003-8615 | 1/2003 |
| JP | 2008-146486 | 2/2008 |

OTHER PUBLICATIONS

Notification of Reasons for Refusal issued by the Japanese Patent Office on Mar. 26, 2013, for Japanese Patent Application No. 2011-525692, and English-language translation thereof.
English-language International Search Report from the Japanese Patent Office in International Application No. PCT/JP2009/003744 mailed Feb. 2, 2010.

* cited by examiner

*Primary Examiner* — Hong Cho
(74) *Attorney, Agent, or Firm* — Finnegan, Henderson, Farabow, Garrett & Dunner, L.L.P.

(57) ABSTRACT

One embodiment provides a communication apparatus including: a first storage which stores connection information and an address; a connection information reading portion which reads connection information from the first storage upon reception of a packet transmission start instruction; a header generating portion which generates a header of a packet from the read connection information; a second storage which stores data at the address; and a data reading portion which reads data corresponding to the read connection information from the second storage, wherein the connection information reading portion is constituted by a first hardware, wherein the header generating and data reading portions are constituted by a second hardware, and wherein, while the data reading portion is reading data of a first packet or while the header generating portion is generating a header of the first packet, the connection information reading portion reads connection information of a second packet.

7 Claims, 11 Drawing Sheets

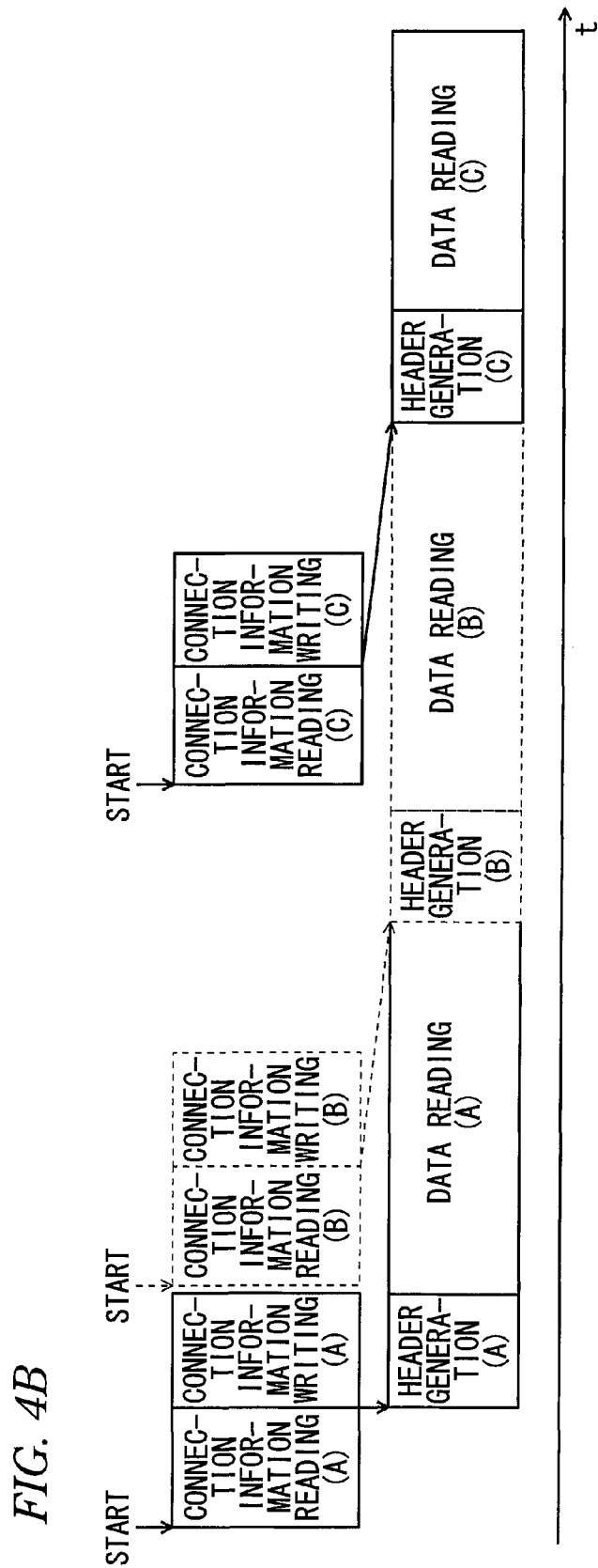

COMMUNICATION APPARATUS

CROSS-REFERENCE TO RELATED APPLICATION(S)

This is a Continuation Application of PCT Application No. PCT/JP09/003744, filed on Aug. 5, 2009, which was published under PCT Article 21(2) in Japanese, the entire contents of which are incorporated herein by reference.

FIELD

Embodiments described herein relate generally to a communication apparatus.

BACKGROUND

TCP/IP is used as a protocol in Internet communication. Heretofore, the TCP/IP is implemented mainly by software processing and operated, for example, by a CPU of a personal computer, a built-in device, or the like.

Recently, however, the load of network processing is increased with the increase in the bandwidth of a network infrastructure and the increase in the bandwidth of video contents etc. transmitted through networks, and performance in the processing performed by the CPU has become insufficient.

Therefore, there is proposed to utilize a TOE (TCP/IP Offload Engine) which performs TCP/IP processing in place of the CPU. By performing TCP/IP protocol processing with sub-processors or hardware modules included in the TOE, such processing can be performed at more higher speed.

For example, JP-2008-146486-A proposes a technique in which a TOE includes plural sub-processors which perform TCP(UDP)/IP processing in parallel. That is, the TOE has a sub-processor A which executes processing of a part of socket API, a sub-processor B which executes TCP(UDP) reception processing, a sub-processor C which executes TCP(UDP) transmission processing, a sub-processor D which executes an MAC driver and IP reception processing, a sub-processor E which executes the MAC driver and IP transmission processing, and these sub-processors perform processing in parallel.

However, JP-2008-146486-A does not mention a method for performing the TCP(UDP) transmission processing of the TCP/IP processing in parallel.

In the TCP(UDP) transmission processing of the TCP/IP processing, plural processes such as reading of connection information, writing of data of a packet, generation of a header and writing of updated connection information have to be performed. Previously, there is no proposal for executing some of these processes in parallel.

BRIEF DESCRIPTION OF DRAWINGS

A general architecture that implements the various features of the present invention will now be described with reference to the drawings. The drawings and the associated descriptions are provided to illustrate embodiments and not to limit the scope of the present invention.

FIGS. 4A and 4B illustrate Embodiment 2.

DETAILED DESCRIPTION

In general, one embodiment provides a communication apparatus for generating a packet including a header and data and transmitting the packet to a terminal through a network, the apparatus including: a first storage which stores connection information including a connection between the apparatus and the terminal and an address at which data corresponding to the connection is stored; a connection information reading portion which reads connection information from the first storage upon reception of a packet transmission start instruction; a header generating portion which generates a header of a packet from the connection information read by the connection information reading portion; a second storage which stores the data corresponding to the connection, at the address which is included in the connection information; and a data reading portion which reads data corresponding to the connection information read by the connection information reading portion, from the address of the second storage, wherein the connection information reading portion is constituted by a first hardware module, wherein the header generating portion and the data reading portion are constituted by a second hardware module which is operable in parallel with the first hardware module, and wherein, while the data reading portion is reading data of a first packet or while the header generating portion is generating a header of the first packet, the connection information reading portion reads connection information of a second packet to be transmitted next to the first packet.

Embodiments will be described below.

Embodiment 1

Figure 1:
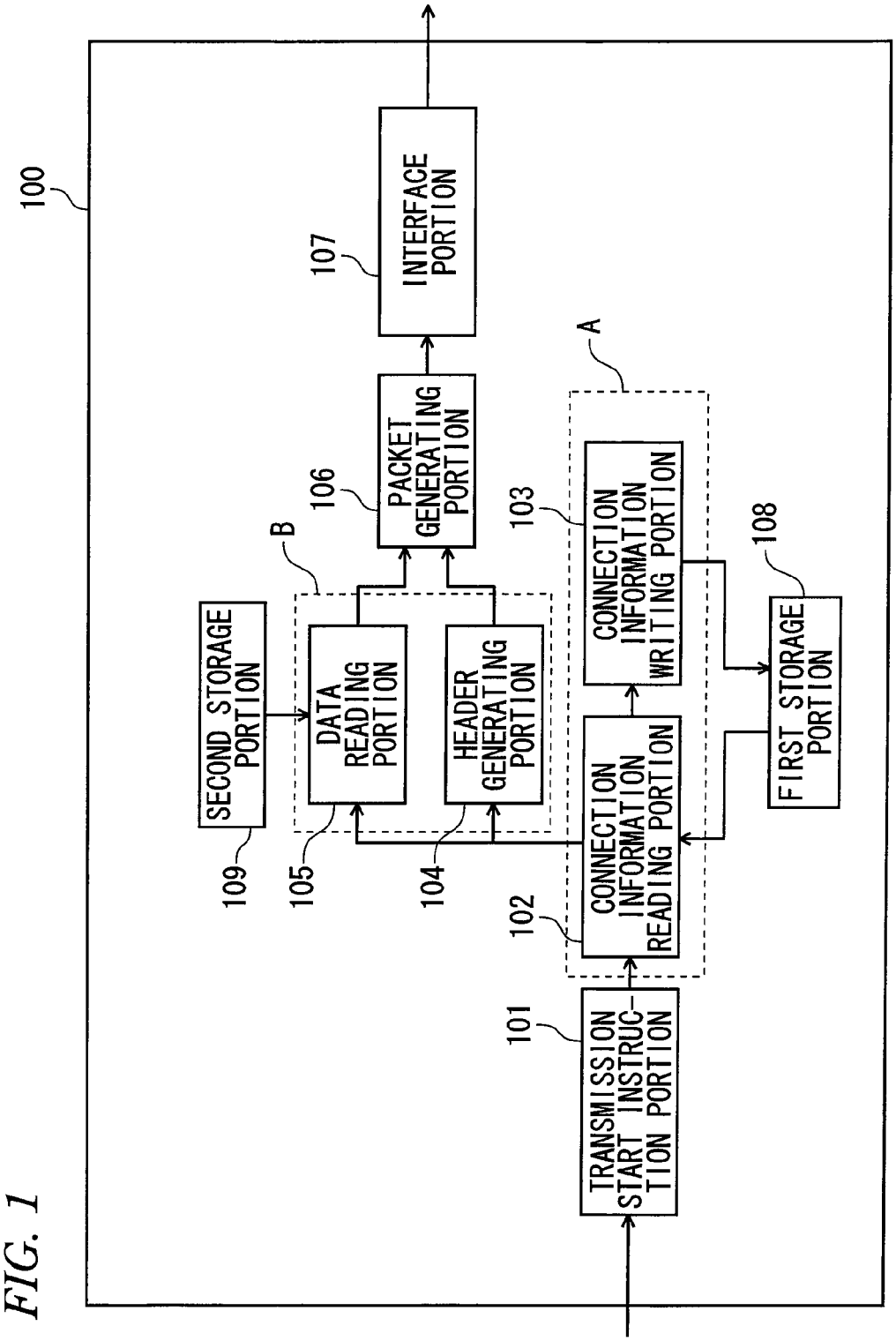
FIG. 1 illustrates a communication apparatus according to Embodiment 1.

FIG. 1 illustrates a communication apparatus 100 according to Embodiment 1.

The communication apparatus 100 transmits packets to a network (e.g. Ethernet (R) or wireless LAN) by a protocol such as TCP/IP or UDP/IP. As shown in FIG. 1, the communication apparatus 100 includes a transmission start instruction portion 101, a connection information reading portion 102, a connection information writing portion 103, a header generating portion 104, a data reading portion 105, a packet generating portion 106, an interface portion 107, a first storage portion 108, and a second storage portion 109.

Here, the connection information reading portion 102 and the connection information writing portion 103 are constituted by a hardware module A. In addition, the header generating portion 104 and the data reading portion 105 are constituted by a hardware module B. Each of the hardware modules A and B is, for example, a CPLD (Complex Programmable Logic Device) or an ASIC. That is, the hardware module A performs connection information reading and connection information writing and the hardware module B performs header generation and data reading. The hardware module A and the hardware module B operate in parallel. Accordingly, connection information reading by the connection information reading portion 102 and connection information writing by the connection information writing portion 103 can be operated (parallel-operated) simultaneously with header generation by the header generating portion 104 and data reading by the data reading portion 105 respectively. For example, during data reading by the data reading portion 105 or header generation by the header generating portion 104 in order to generate a packet, connection information can be read by the connection information reading portion 102 in order to generate a packet to be transmitted next to the packet. As a result, the processing speed of packet transmission processing can be improved.

The first storage portion 108 stores connection information in accordance with each connection. The connection is determined based on a sender IP address, a sender port number, a receiver IP address and a receiver port number between a sender (such as the communication apparatus 100) and a receiver (such as a terminal to which a packet will be transmitted) in communication in the TCP/IP protocol or the UDP/IP protocol. In addition, the connection information means information corresponding to each connection. The connection information is information including the connection (the sender IP address, the sender port number, the receiver IP address and the receiver port number), a first address indicating a place of the second storage portion 109 where data corresponding to the connection is stored, and information (hereinafter referred to as transmitted data information) indicating that up to which part of data which should be transmitted in accordance with each connection has been transmitted by packet.

The second storage portion 109 stores data to be transmitted in accordance with each connection.

The transmission start instruction portion 101 accepts a transmission request including a designated connection for data intended to be transmitted, from an external application (not shown). The connection is designated by an address (second address) at which connection information of the connection is stored in the first storage portion 108. The transmission start instruction portion 101 designates the second address (i.e. designates a connection intended to be transmitted), and issues a packet transmission start instruction to the connection information reading portion 102. Here, since one packet corresponds to one piece of data which is intended to be transmitted by one connection and which is divided into pieces each small enough to be transmitted in one time, the transmission start instruction portion 101 issues a packet transmission start instruction several times in response to the transmission request made once by the external application. In addition, when transmission requests with respect to connections have been received from the external application, the transmission start instruction portion 101 holds (forms a queue of) the transmission requests once internally, takes one out of the transmission requests sequentially and issues a packet transmission start instruction to the connection information reading portion 102.

Upon reception of the transmission start instruction from the transmission start instruction portion 101, the connection information reading portion 102 reads connection information corresponding to the second address from the first storage portion 108.

The data reading portion 105 reads data from the second storage portion 109 based on the connection information read by the connection information reading portion 102. Here, the data reading portion 105 reads data based on the first address and transmitted data information.

The header generating portion 104 generates a header of a packet using a connection of the connection information read by the connection information reading portion 102.

The packet generating portion 106 generates a packet using the data read by the data reading portion 105 and the header generated by the header generating portion 104.

The interface portion 107 performs processing of a data link layer (MAC) and a physical layer (PHY) in the packet and transmits the packet onto a network.

The connection information writing portion 103 updates transmitted data information corresponding to the read connection information in the first storage portion 108 based on the connection information read by the connection information reading portion 102. Incidentally, writing by the connection information writing portion 103 for generating a packet is performed before connection information is read by the connection information reading portion 102 for generating another packet which will be transmitted following the packet.

Figure 2:
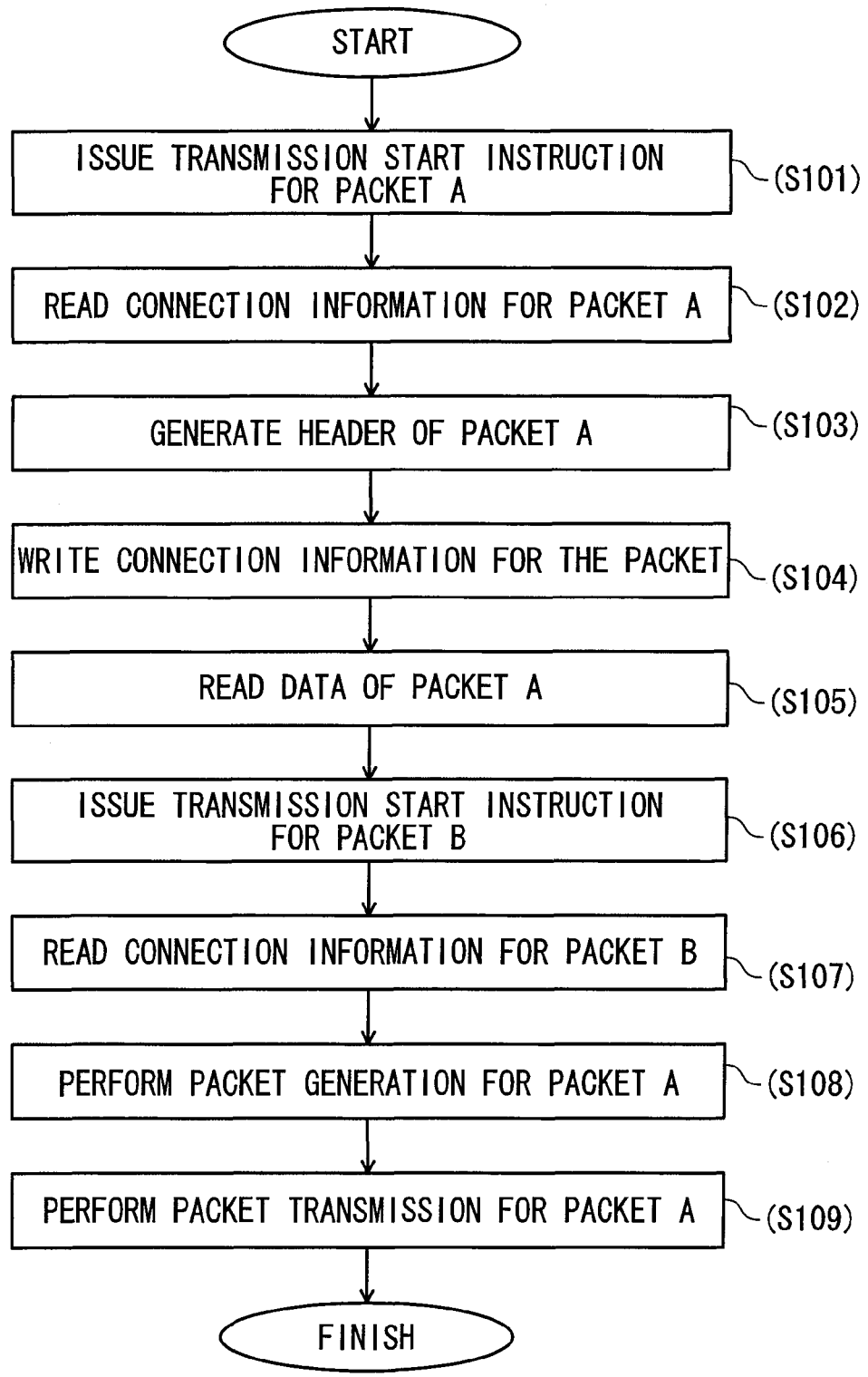
FIG. 2 is a flow chart showing operation of the communication apparatus according to Embodiment 1.
Figure 3:
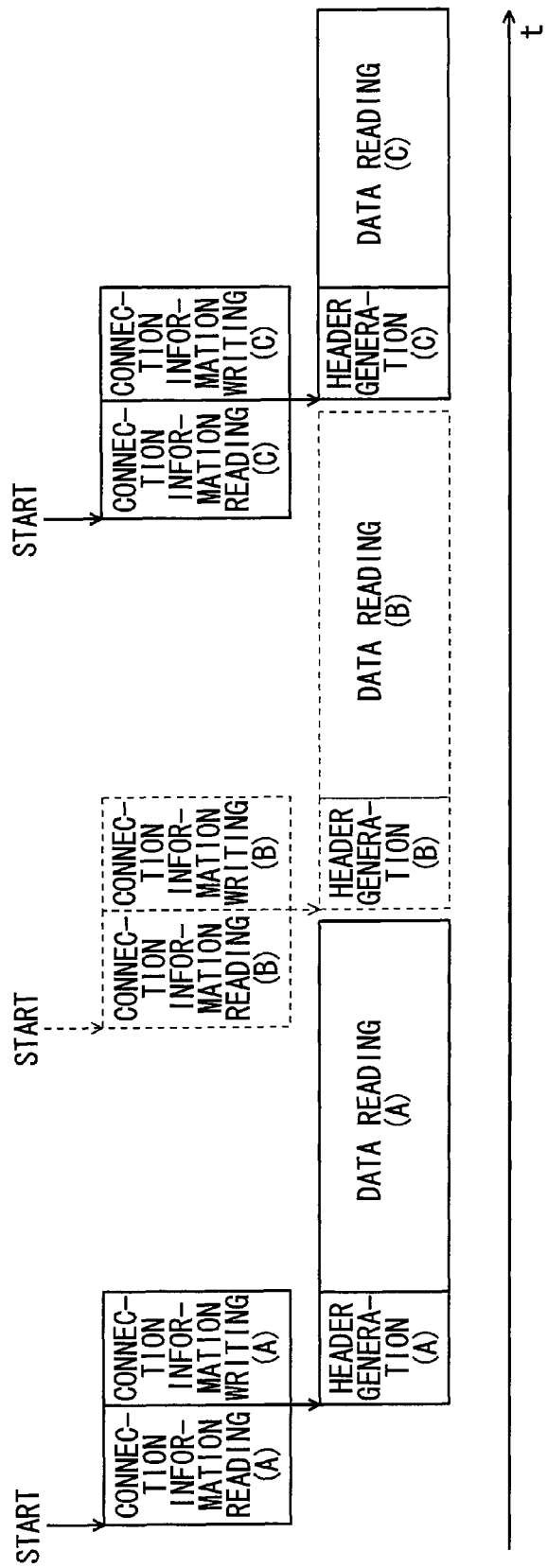
FIG. 3 is a time chart showing operation of the communication apparatus according to Embodiment 1.

Next, an operation method of the communication apparatus 100 will be described. Description will be made below in the case where packets are transmitted based on the TCP/IP protocol. Assume that 1,500 bytes are transmitted in each packet transmission (in which data is assumed to be 1,460 bytes and the header is assumed to be 40 bytes). FIG. 2 is a flow chart showing packet transmission operation of the communication apparatus 100. FIG. 3 is a time chart showing packet transmission processing of the communication apparatus 100. In FIG. 3, connection information reading, connection information writing, header generation and data reading are indicated as processing for generating one packet. In FIG. 3, a time axis is set in a right (lateral) direction. A state in which an upper part (connection information reading and connection information writing) and a lower part (header generation and data reading) are processed in parallel is shown. As described above, processing in the upper part is performed by the hardware module A while processing in the lower part is performed by the hardware module B. A flow chart for generating three packets is shown in FIG. 3. Hereinafter, the three packets are regarded as packet A, packet B and packet C in the time axis. In FIG. 3, processing of the packet A and the packet C is indicated by a solid line and processing of the packet B is indicated by a dotted line.

First, the transmission start instruction portion 101 designates a connection 1 for the first packet A and issues a packet transmission start instruction to the connection information reading portion 102 (S101). Here, assume that the connection 1 is a connection indicating that the sender is the communication apparatus 100 and the receiver is a terminal A.

Then, the connection information reading portion 102 reads connection information for the packet A from the first storage portion 108 (S102). For example, the connection information reading portion 102 temporarily stores the read connection information in a register (not shown).

Then, the header generating portion 104 generates a header of the packet A from the connection of the read connection information (S103). Specifically, while, for example, four bytes are selected in every clock cycle from the aforementioned read connection information, the four bytes are outputted to a post stage in accordance with an array of the header conformed to the TCP/IP specification. After the cycle is performed 10 times, a 40-byte TCP/IP header is outputted.

Then, the connection information writing portion 103 updates transmitted data information of the connection corresponding to the read connection information in the first storage portion 108 based on the connection information read by the connection information reading portion 102 after the header generating portion 104 starts generation of the header (or at the same time that the header generating portion 104 starts generation of the header) (S104). The communication apparatus 100 performs the update to add 1460-byte data as the transmitted data information for the connection corresponding to the connection information read by the connection information reading portion 102 in the step 102 in order to transmit the 1460-byte data per packet as will be described later. It is arranged that the communication apparatus 100 transmits 1460-bye data per packet. Accordingly, even if the communication apparatus 100 does not actually transmit the packet A, the connection information writing portion 103 can perform writing on the connection information as long as the read connection information is known.

The data reading portion 105 specifies an address of data to be transmitted by the packet A from the second storage portion 109, based on, of the connection information concerned with the packet A, information of a first address of data of the second storage portion 109 corresponding to the connection (e.g. a start address and an end address of the data corresponding to the connection) and the transmitted data information (e.g. the number of bytes which have been transmitted), and reads the data (S105). For example, assume that the data of the second storage portion 109 corresponding to the connection has an address region from the start address 0x01000000 to the end address 0x010fffff (1M bytes long). In addition, assume that the transmitted data information indicates 1460 bytes have been transmitted. In this case, the data reading portion 105 starts reading data at the following address as the data to be transmitted from the second storage portion 109. That is, the data is read from 0x01000000+1460=0x010005b4. The data reading portion 105 reads data of total 1460 bytes 4 bytes by 4 bytes sequentially from the start address of the data. That is, in order to read the whole data, the data reading portion 105 has to perform 365 cycles (=1460/4). The data reading portion 105 outputs 4 bytes by 4 bytes sequentially to the packet generating portion 106.

While the data reading portion 105 is reading the data of the packet A, the transmission start instruction portion 101 designates a connection 1 for a second packet B and issues a packet transmission start instruction to the connection information reading portion 102 (S106). For example, it is preferable that the transmission start instruction portion 101 issues a transmission start instruction at such a timing that the connection information reading portion 102 can complete reading connection information for the packet B until the data reading portion 105 completes reading the data of the first packet A.

Then, the connection information reading portion 102 reads the connection information for the packet B from the first storage portion 108 (S107). Here, the connection information reading portion 102 reads connection information of the connection 1. The connection information is connection information which has been written and updated by the connection information writing portion 103 in S 104. That is, the connection information is information in which 1460-byte data as to the transmitted data information has been added to the connection information which was read for the packet A. Due to writing by the connection information writing portion 103 before reading for the packet B by the connection information reading portion 102, it is possible to prevent transmission of data overlapping with the data transmitted by one packet A.

Then, the packet generating portion 106 outputs data of a packet to be transmitted, e.g. 4 bytes by 4 bytes sequentially, to the interface portion 107 while buffering the header generated by the header generating portion 104 and the data read by the data reading portion 105 (S108).

Upon reception of the packet from the packet generating portion 106, the interface portion 107 sends the packet out on the network (S109).

As described above, the communication apparatus 100 can perform data reading processing for the packet A and connection information reading processing for the connection information of the packet B in parallel. Thus, improvement in the processing speed of packet transmission processing of the communication apparatus 100 can be achieved. Particularly, in the embodiment, when a transmission start instruction is issued at a proper timing, the connection information reading portion 102 completes reading the connection information for the packet B until the data reading portion 105 completes reading data for the first packet A. Thus, as shown in FIG. 3, the header generating processing and the data reading processing can be operated continuously without being temporally affected by the connection information reading processing and the connection information writing processing. As a result, improvement in the processing speed of packet transmission processing of the communication apparatus 100 can be achieved.

As described above, the communication apparatus 100 can be operated to perform the header generating processing and the data reading processing in the total of 375 clock cycles continuously without being temporally affected by the connection information reading processing and the connection information writing processing.

The embodiment has been described in the case where the data reading portion 105 performs data reading after the header generating portion 104 performs header generation by way of example. However, header generation may be performed after the data reading portion 105 performs data reading. Although a header has to come before data at the time point when a packet is transmitted on the network, the packet generating portion 106 or the interface portion 107 may buffer the header and the data and then transmit the header and the data in that order. In this case, it is preferable that the connection information reading portion 102 completes reading the connection information for the packet B before the header generating portion 104 completes generation of the header of the packet A.

In the embodiment, the connection information for the packet A is written after the header generating portion 104 starts generation of the header (or at the same time that the header generating portion 104 starts generation of the header). However, the embodiment is not limited thereto. That is, the connection information may be written before reading for the packet B is started by the connection information reading portion 102.

In addition, in the embodiment, data of the same connection 1 as to the packet A and the packet B are transmitted continuously. However, plural connections may be transmitted in sequence. For example, when three connections (connection 1, connection 2, and connection 3) are transmitted simultaneously, the transmission start instruction portion 101 internally holds transmission requests for the three connections from an external application, and issues instructions sequentially in the order of transmission of a first packet for the connection 1, transmission of a first packet for the connection 2, transmission of a first packet for the connection 3, transmission of a second packet for the connection 1, transmission of a second packet for the connection 2, transmission of a second packet for the connection 3 . . . . When data of the plural connections are transmitted sequentially thus, delay of a specific connection can be prevented. The reason why packets of different connections can be transmitted alternately thus is because connection information reading by the connection information reading portion 102 and connection information writing are performed whenever a packet is transmitted.

The communication apparatus 100 according to the embodiment can be achieved by using a general-purpose computer apparatus as basic hardware module. That is, the transmission start instruction portion 101, the connection information reading portion 102, the connection information writing portion 103, the data reading portion 105, the header generating portion 104, the packet generating portion 106, and the interface portion 107 can be achieved by executing a program on a processor mounted in the computer apparatus. On this occasion, the communication apparatus 100 can be achieved by executing the aforementioned program. On this occasion, the communication apparatus 100 may be achieved by installing the aforementioned program into the computer apparatus in advance or may be achieved by storing the aforementioned program in a storage medium such as a CD-ROM or by distributing the aforementioned program through a network and installing the program into the computer apparatus suitably. In addition, the first storage portion 108 and the second storage portion 109 can be achieved by properly using a memory or a hard disk built in the aforementioned computer apparatus or provided outside the aforementioned computer apparatus, storage media such as a CD-R, a CD-RW, a DVD-RAM and a DVD-R, etc.

Embodiment 2

Figure 4A:
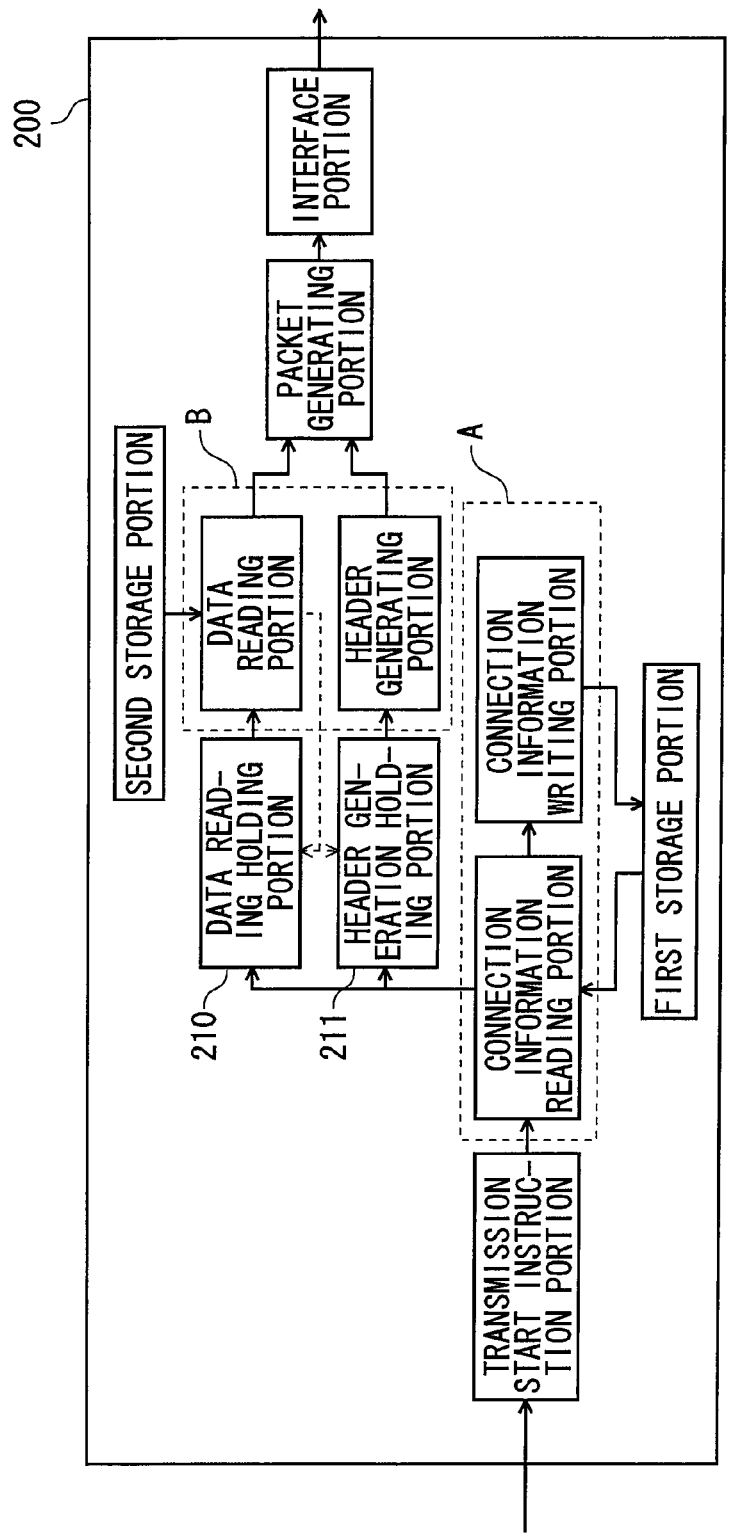

FIG. 4A shows a communication apparatus 200 according to Embodiment 2. FIG. 4B shows a time chart of packet transmission of the communication apparatus 200.

The communication apparatus 200 includes a data reading holding portion 210 and a header generation holding portion 220 in addition to the configuration of the communication apparatus 100.

The case where connection information of a second packet B is read in accordance with a transmission start instruction for the packet B while data of a first packet A is being read by the data reading portion 105, and reading the connection information for the packet B is completed before reading the data of the first packet A is completed is shown in FIG. 4B.

Figure 5A:
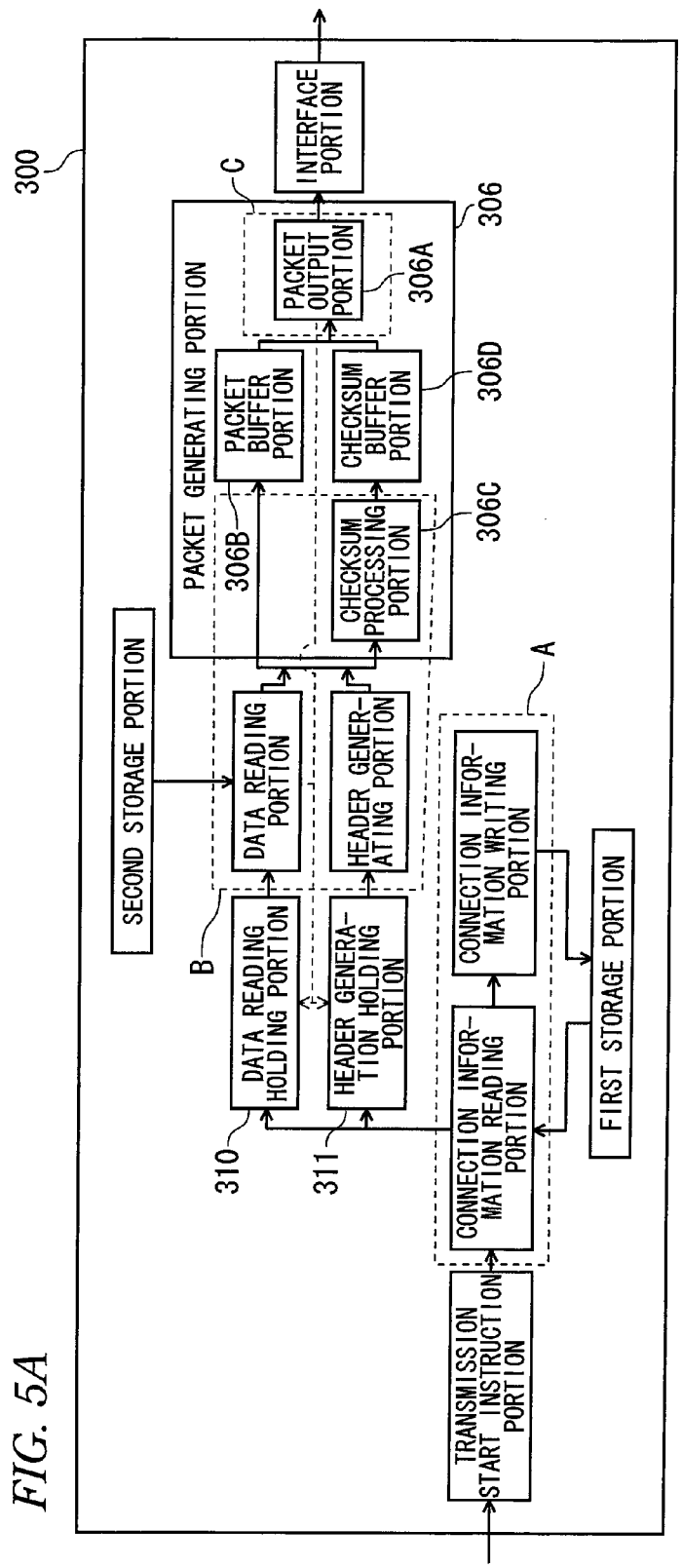
FIGS. 5A and 5B illustrate Embodiment 3.
Figure 5B:
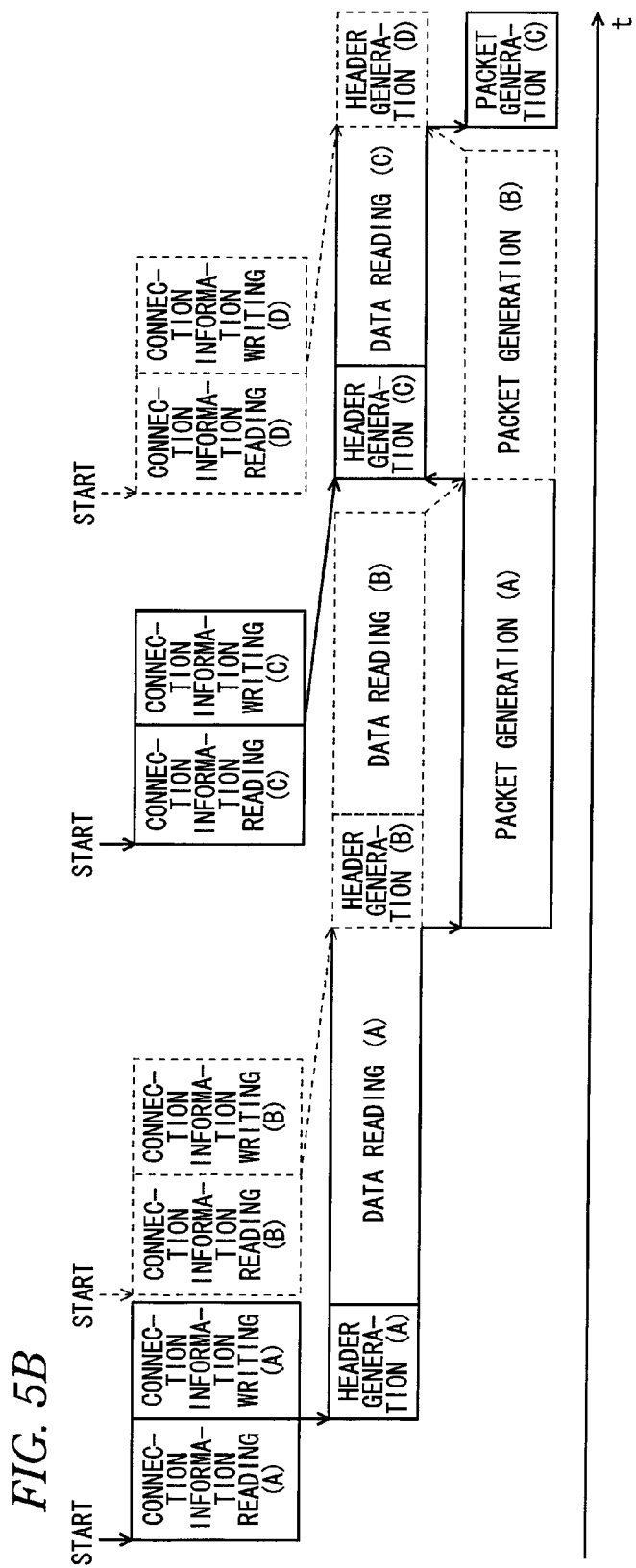

The data reading holding portion 210 holds the data reading portion 105 from performing data reading, based on the connection information. For example, the data reading holding portion 210 stores the connection information temporarily. When, for examples, the connection information reading portion 102 completes reading the connection information for the packet B before the data reading portion 105 completes reading the data of the packet A, the data reading holding portion 210 holds the data reading portion 105 from reading the data of the packet B, until reading the data of the packet A is completed. As shown in FIGS. 5A and 5B, after reading the data of the packet A has been completed by the data reading portion 105, the data reading holding portion 210 cancels holding the data reading portion 105 from reading the data of the packet B so that the data reading portion 105 starts reading the data of the packet B based on the connection information for the packet B.

In addition, the header generation holding portion 211 holds the header generating portion 104 from generating a header, based on the connection information. For example, the header generation holding portion 211 stores the connection information temporarily. When, for example, the connection information reading portion 102 completes reading the connection information for the packet B before the data reading portion 105 completes reading the data of the packet A, the header generation holding portion 211 holds the header generating portion 104 from generating a header of the packet B. As shown in FIGS. 5A and 5B, the header generation holding portion 211 cancels holding the header generating portion 104 from generating a header of the packet B, after the data reading portion 105 completes reading the data of the packet A, so that the header generating portion 104 starts generating a header of the packet B.

According to the communication apparatus 200, even when a transmission start instruction is issued at an early timing in reading of data of a first packet A and the connection information reading portion 102 reads connection information before completion of data reading of the packet A, the data reading holding portion 210 and the header generation holding portion 211 holds data reading and header generation based on the connection information until reading the data of the packet A is completed. Accordingly, connection information reading processing and header generation processing can be appropriately performed in parallel with the data reading. In addition, since a transmission start instruction for a packet B is issued so that the connection information reading portion 102 can read connection information at an early stage, the connection information reading portion 102 can complete reading the connection information for the packet B before the data reading portion 105 completes reading the data of the first packet A. In this manner, as shown in FIGS. 5A and 5B, the header generation processing and the data reading processing can be operated continuously without being temporally affected by the connection information reading processing and the connection information writing processing. As a result, improvement in the processing speed for packet transmission processing in the communication apparatus 200 can be achieved.

Incidentally, in the embodiment, processing is performed in the order of header generation and data reading. However, processing may be performed in the order of data reading and header generation. In this case, the header generation holding portion 211 and the data reading holding portion 210 hold header generation and data reading for the packet B respectively until generation of the header of the first packet A is completed.

Incidentally, in the embodiment, the relation between the first packet A and the second packet B has been described. However, the embodiment is not limited to the relation between the first packet A and the second packet B. For example, the embodiment may be also applied to a fifth packet and a sixth packet.

Embodiment 3

FIG. 5A shows a communication apparatus 300 according to Embodiment 3. FIG. 5B shows a time chart of packet transmission of the communication apparatus 300. In the time chart of FIG. 5B, a lower part indicates packet generation, a middle part indicates header generation and data reading, and an upper part indicates connection information reading and connection information writing. In FIGS. 5A and 5B, connection information reading, connection information writing, header generation, data reading and packet generation are indicated as processing for generating one packet. A state in which the upper part (connection information reading and connection information writing), the middle part (header generation and data reading) and the lower part (packet generation processing) are processed in parallel is shown. Incidentally, as will be described later, the processing in the upper part, the processing in the middle part and the processing in the lower part are performed by a hardware module A, a hardware module B and a hardware module C respectively. The hardware module C will be described later. A time chart for generating three packets is shown in FIG. 5B. Hereinafter, the three packets are regarded as packet A, packet B and packet C respectively in a time axis. In FIG. 5B, processings for the packet A and the packet C are indicated by a solid line while processing for the packet B is indicated by a dotted line.

A packet generating portion 306 of the communication apparatus 300 is configured to include a packet output portion 306A, a packet buffer portion 306B, a checksum processing portion 306C, and a checksum buffer portion 306D. In addition, the packet output portion 306A is constituted by the hardware module C. The hardware module C is operable in parallel with the hardware module A and the hardware module B. Accordingly, packet generation processing of the packet output portion 306A can be performed in parallel with connection information reading by the connection information reading portion 102 and connection information writing by the connection information writing portion 103. In addition, the packet generation processing of the packet output portion 306A can be performed in parallel with data reading by the data reading portion 105 and header generation by the header generating portion 104.

The checksum processing portion 306C calculates a checksum value from data read by the data reading portion 105 and a header generated by the header generating portion 104. Incidentally, the checksum processing portion 306C is included in the hardware module B.

The checksum buffer portion 306D stores the checksum value calculated by the checksum processing portion 306C.

The packet buffer portion 306B buffers the header generated by the header generating portion 104 and the data read by the data reading portion 105 (e.g. the data and the header correspond to the packet B).

In parallel with buffering of the data and the header (corresponding to the packet B) by the packet buffer portion 306B (i.e. in parallel with the data reading performed by the data reading portion 105 and the header generation performed by the header generating portion 104), the packet output portion 306A stores a checksum value buffered by the checksum buffer portion 306D into a previous header and previous data buffered by the packet buffer portion 306B. Packets generated thus are outputted sequentially as packets (e.g. the packet A).

As shown in FIG. 5B, a header generation holding portion 311 and a data reading holding portion 310 hold header generation and data reading (corresponding to the packet C) respectively until data reading of the packet (the packet B) previous to the present time (when the packet C is being generated) is completed and until output of the packet (the packet A) generated before the previous packet is completed by the packet output portion 306A. This is because a header and data for packet generation of the previous packet (the packet B) are stored in the packet buffer portion 306B until packet output of the packet (the packet A) before the previous packet is completed so that the packet buffer portion 306B cannot process a header and data for generation of the current packet (the packet C) even if the header and the data are generated.

According to the embodiment, packet generation processing performed by the packet output portion 306A, data reading and header generation, and connection information reading and connection information writing can be operated in parallel properly. As a result, improvement in the processing speed of packet transmission processing of the communication apparatus 300 can be achieved.

Embodiment 4

Figure 6A:
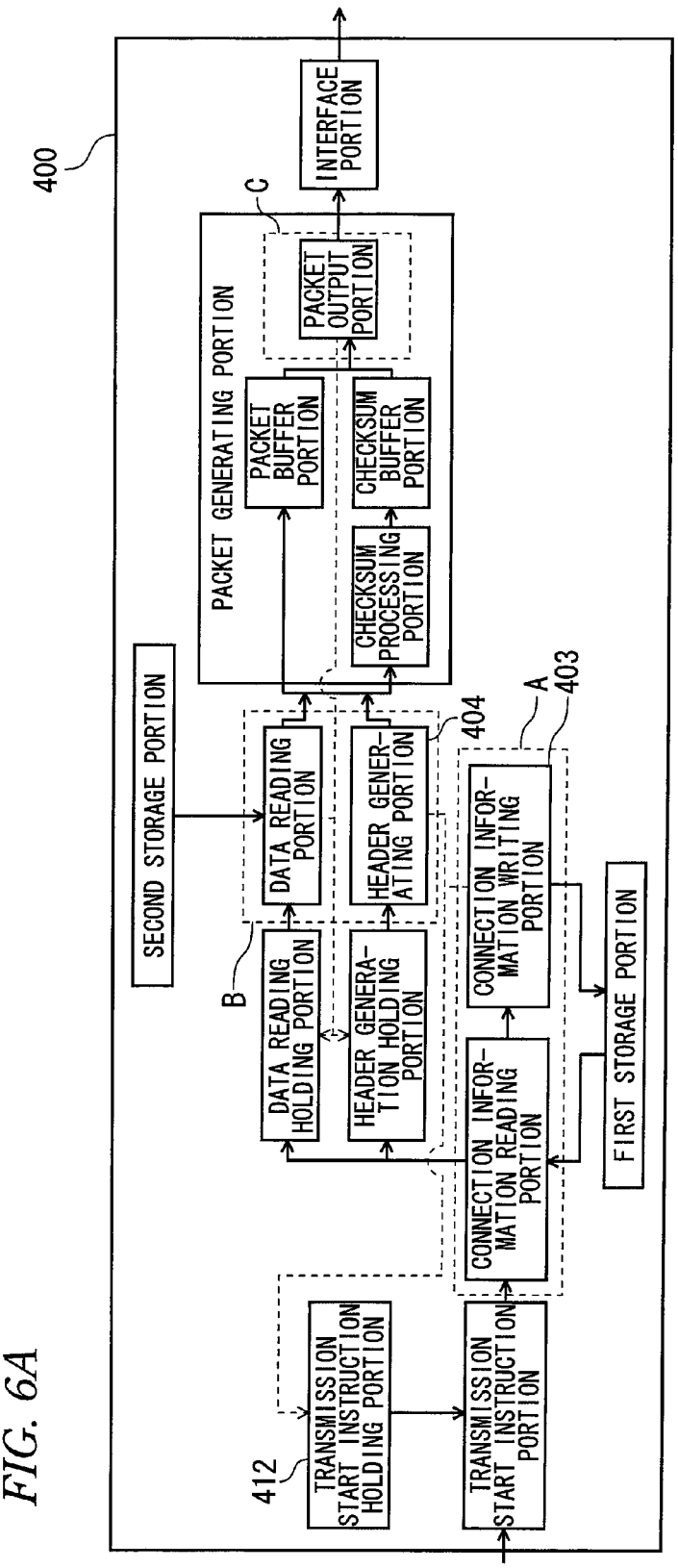
FIGS. 6A and 6B illustrate Embodiment 4.
Figure 6B:
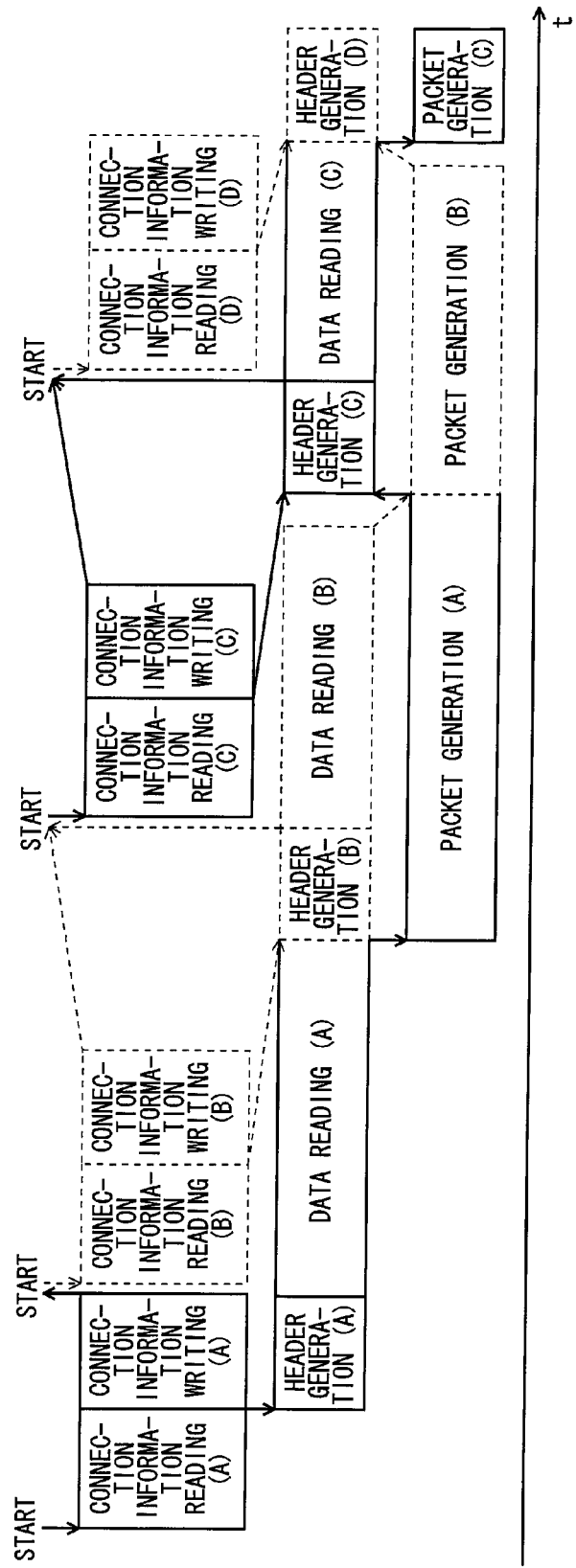

FIG. 6A shows a communication apparatus 400 according to Embodiment 4. FIG. 6B shows a time chart of packet transmission of the communication apparatus 400.

The communication apparatus 400 further includes a transmission start instruction holding portion 412 in addition to the configuration of the communication apparatus 300 according to Embodiment 3.

The transmission start instruction holding portion 412 controls a timing at which the transmission start instruction portion 101 is allowed to issue a transmission start instruction to the connection information reading portion 102. The transmission start instruction holding portion 412 performs control so that a transmission start instruction of a packet (e.g. the packet B), whose transmission start will be instructed by the transmission start instruction portion, can be issued after writing connection information of a previous packet (e.g. the packet A) is completed (assume this as condition 1). For example, upon reception of a signal indicating that a connection information writing portion 403 has completed writing the connection information, the transmission start holding portion allows the transmission start instruction portion 101 to issue a transmission start instruction. Since writing is performed by the connection information writing portion 403 before the connection information reading portion 102 performs reading for the packet B, data overlapped with data transmitted in the previous packet A can be prevented from being transmitted in the packet B.

In addition, the transmission start instruction holding portion 412 performs control so that the transmission start instruction portion 101 can issue a transmission start instruction of a packet (e.g. the packet C) whose transmission start will be instructed by the transmission start instruction portion 101, after header generation of a packet (e.g. the packet B) previous to the packet whose transmission start will be instructed by the transmission start instruction portion 101 is completed (assume this as condition 2). For example, upon reception of a signal, which indicates the completion of header generation for the packet B, from a header generating portion 404, the transmission start holding portion allows the transmission start instruction portion 101 to issue a transmission start instruction for the packet C. Header generation of each packet is performed based on read connection information. When the connection information of the next packet C is read before the header generation of the header of the previous packet B has been completed, two pieces of connection information, i.e. both the connection information of the packet B and the connection information of the packet C however have to be retained simultaneously. Not retaining the two pieces of connection information simultaneously can bring about simplification of processing. When the transmission start instruction portion 101 issues a transmission start instruction so as to satisfy the condition 2, the two pieces of connection information can be prevented from being retained simultaneously so that simplification of processing can be achieved.

According to the communication apparatus 400 according to Embodiment 4, transmission start instructions can be issued at proper timings as in the condition 1 and the condition 2, so that parallel processing of transmission processing can be performed properly, and improvement in the efficiency of the transmission processing can be achieved.

Embodiment 5

Figure 7A:
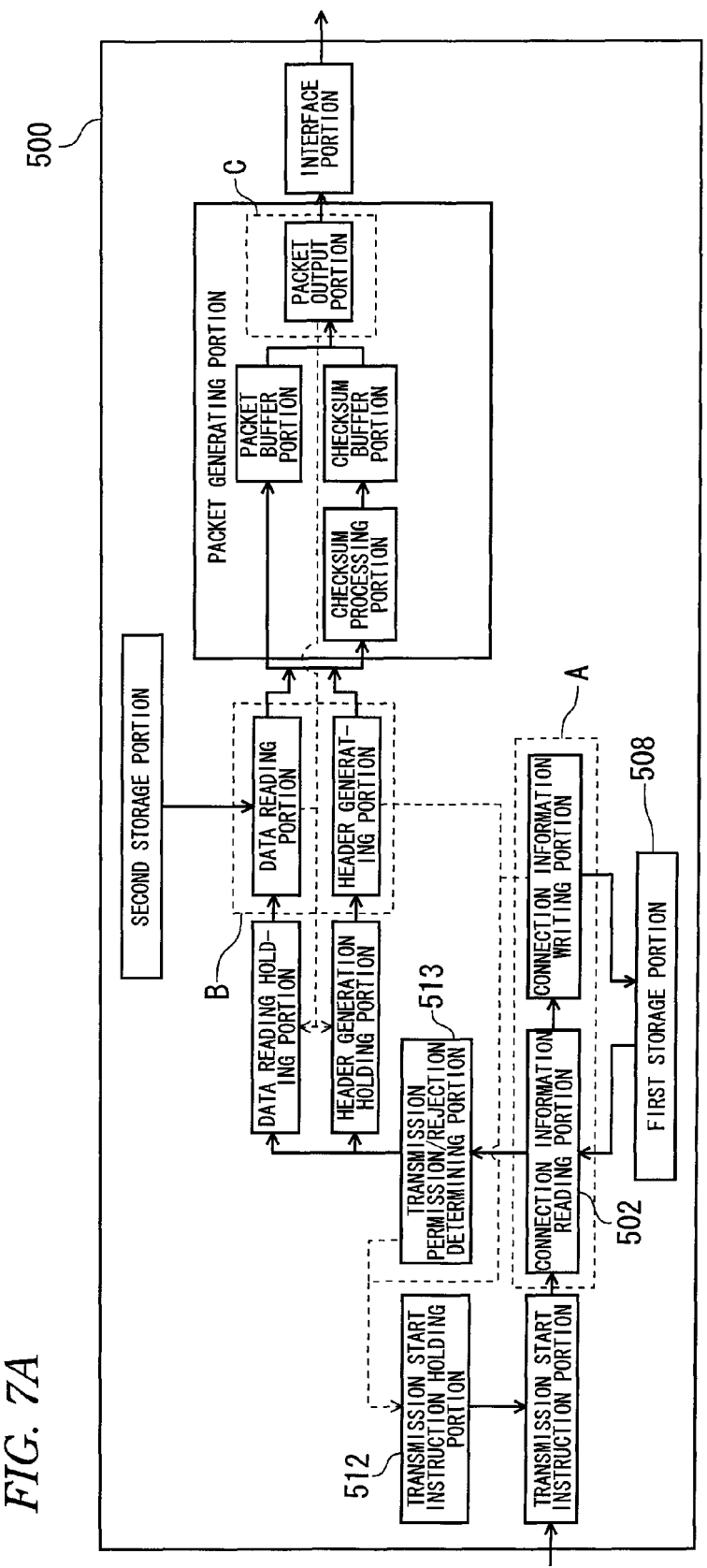
FIGS. 7A and 7B illustrate Embodiment 5.
Figure 7B:
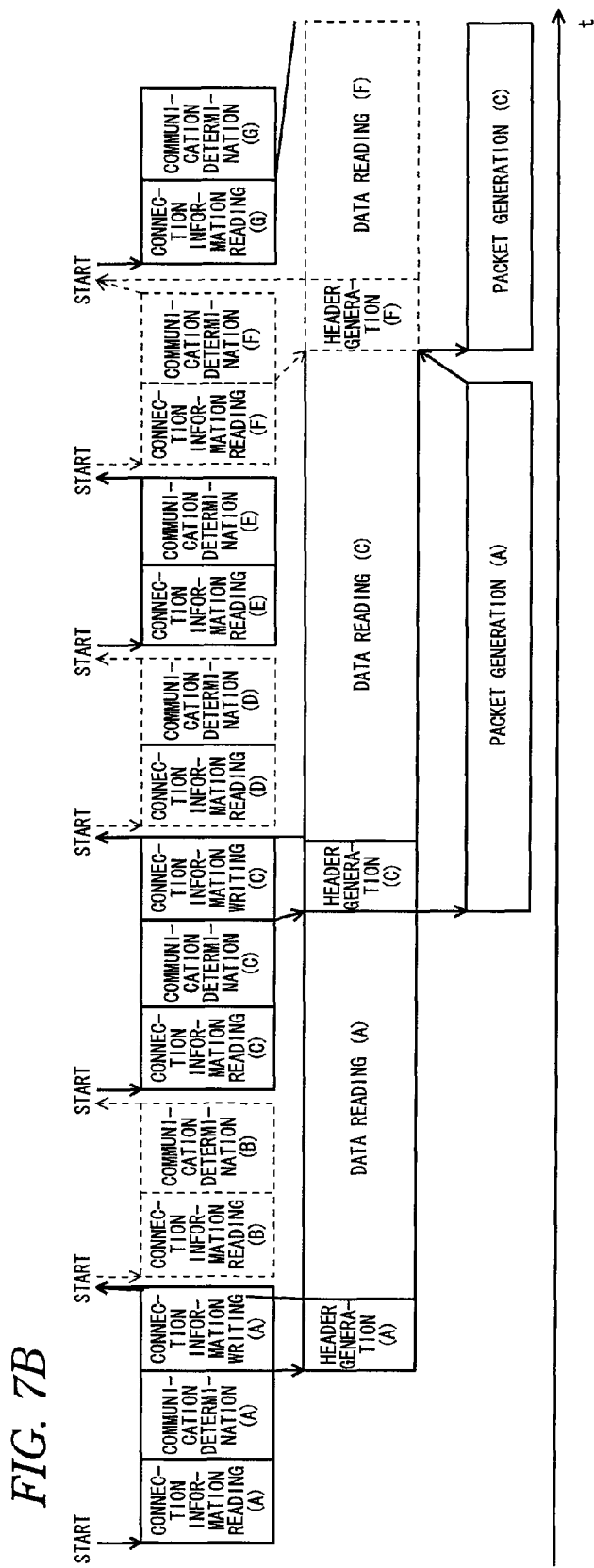

FIG. 7A shows a communication apparatus 500 according to Embodiment 5. FIG. 7B shows a time chart of packet transmission of the communication apparatus 500.

The communication apparatus 500 further includes a transmission permission/rejection determining portion 513 in addition to the configuration of the communication apparatus 400.

In TCP/IP communication, controls such as flow control, congestion control, acknowledgement control, and flow control for a data link layer are performed. In these controls, the transmission permission/rejection determining portion 513 determines whether transmission is allowed or not. Further, when the transmission permission/rejection determining portion 513 makes determination that transmission is allowed, the communication apparatus performs the same operation as those in Embodiments 1 to 4. On the other hand, when the transmission permission/rejection determining portion 513 makes determination that transmission is rejected, the communication apparatus terminates processing for transmitting a packet whose transmission has been determined as rejected, and performs operation for transmission processing of a next packet. In addition, as the processing for transmission of the next packet, the transmission permission/rejection determining portion 513 issues an instruction to the transmission start holding portion to perform transmission start of the next packet. For example, the transmission permission/rejection determining portion 513 releases a transmission start instruction holding portion 512 from holding transmission start. That is, in Embodiment 4, either completion of header generation of a previous packet by the header generating portion 404 or completion of writing of connection information of the previous packet is used as a trigger to release the holding of the transmission start instruction holding portion 512. However, the holding of the transmission start instruction holding portion 512 is released in accordance with an instruction from the transmission permission/rejection determining portion 513 when the transmission permission/rejection determining portion 513 determines the transmission as rejected. Due to the transmission permission/rejection determining portion 513 operating in this manner, transmission processing can be performed as shown in the time chart of FIG. 7B. When, for example, transmission of a second packet B is determined as rejected, operations of transmission processing (data reading, connection information writing and packet generation) after the transmission permission/rejection determination can be dispensed with. In addition, determining transmission as rejected is used as a trigger to issue a transmission start instruction of a third packet C immediately. When transmission of a fourth packet D and transmission of a fifth packet are also determined as rejected, transmission processing after the transmission permission/rejection determination can be dispensed with, so that a transmission start instruction for a sixth packet F is issued immediately. As a result, transmission of a packet whose transmission is determined as allowed can be performed without any delay. For example, header generation and data reading for the sixth packet F can be performed continuously following header generation and data reading for the third packet C.

As shown in the aforementioned operations, operations of transmission processing after transmission permission/rejection determination concerned with a packet whose transmission is determined as rejected in the aforementioned control can be dispensed with so that a transmission start instruction can be issued by the transmission permission/rejection determining portion 513 immediately. Thus, even if there is a packet whose transmission is determined as rejected by the aforementioned control, packet generation can be performed continuously and parallel processing of transmission processing can be performed efficiently.

Here, the TCP flow control is performed as follows. For example, a window size (buffer size) which can be received by a terminal as a packet receiver and which has been received in an ACK packet etc. by the communication apparatus 500 is stored as connection information in the first storage portion 508 in advance. When the connection information reading portion 502 reads the connection information and a packet which will be transmitted exceeds the window size, the transmission permission/rejection determining portion 513 determines the transmission of the packet as rejected, and cancels the transmission. When the packet is within the window size, the transmission permission/rejection determining portion 513 determines the transmission of the packet as allowed, and keeps on the transmission.

In addition, the congestion control means control for lightening congestion of a network with the terminal as a packet receiver. In the congestion control, the communication apparatus 500 defines a congestion window size updated in real time based on predetermination calculation, and stores the congestion window size as connection information in the first storage portion 508 in advance. When the connection information reading portion 502 reads the connection information and the transmission permission/rejection determining portion 513 makes determination that a packet which will be transmitted exceeds the congestion window size, the transmission permission/rejection determining portion 513 determines the transmission of the packet as rejected, and cancels the transmission. When the packet is within the congestion window size, the transmission permission/rejection determining portion 513 determines the transmission of the packet as allowed, and keeps on the transmission.

In the aforementioned TCP flow control and congestion control, information (either the window size in the TCP flow control or the congestion window size in the congestion control) for making determination as to whether transmission of a packet is allowed or not in accordance with each connection is stored as connection information in the first storage portion. The transmission permission/rejection determining portion makes determination as to whether transmission of a packet corresponding to connection information read by the connection information reading portion is allowed or not, based on the connection information.

In addition, the acknowledgement control is performed as follows. When an ACK packet not including data is intended to be transmitted, assume that a packet including data is scheduled to be transmitted following the ACK packet. In this case, the transmission permission/rejection determining portion 513 determines transmission of the ACK packet not including data as rejected and suspends the transmission in order to transmit ACK information taking a share (piggyback) ride with the packet including data. Otherwise, the transmission permission/rejection determining portion 513 determines transmission of the packet as allowed and keeps on the transmission processing.

The flow control from the data link layer is performed as follows. When a request frame (a PAUSE frame of Ethernet (R) etc.) for suppressing packet transmission has been received from a data link layer processing portion (an MAC processing portion) of the terminal as a packet receiver, the transmission permission/rejection determining portion 513 determines transmission of the packet as rejected and suspends the transmission for a predetermined time or until a frame indicating a request for cancelling the suppression is received. When there is no suppression or when the suppression is cancelled, the transmission permission/rejection determining portion 513 determines transmission of the packet as allowed and keeps on transmission processing of the packet.

The invention is not limited to the aforementioned embodiments and components may be modified to embody the invention without departing from the sprit thereof. Components of the embodiments may be suitably and variously combined. For example, some of all components of each embodiment may be omitted, and components of different embodiments may be combined suitably.

The invention claimed is:

1. A communication apparatus for generating a packet including a header and data and transmitting the packet to a terminal through a network, the apparatus comprising:
   a first storage which stores connection information including a connection between the apparatus and the terminal and an address at which data corresponding to the connection is stored;

a connection information reading portion which reads connection information from the first storage upon reception of a packet transmission start instruction;

a header generating portion which generates a header of a packet from the connection information read by the connection information reading portion;

a second storage which stores the data corresponding to the connection, at the address which is included in the connection information; and a data reading portion which reads data corresponding to the connection information read by the connection information reading portion, from the address of the second storage, wherein the connection information reading portion is constituted by a first hardware module, wherein the header generating portion and the data reading portion are constituted by a second hardware module which is operable in parallel with the first hardware module, and wherein, while the data reading portion is reading data of a first packet or while the header generating portion is generating a header of the first packet, the connection information reading portion reads connection information of a second packet to be transmitted next to the first packet.

2. The apparatus of claim 1, further comprising:

a connection information writing portion, wherein the connection information stored by the first storage further includes transmitted data information indicating transmitted data of data to be transmitted in accordance with each connection, wherein the connection information writing portion updates transmitted data information of the first storage based on connection information read by the connection information reading portion, wherein the data reading portion reads data from the second storage based on the address and the transmitted data information of the connection information read by the connection information reading portion, and wherein the connection information writing portion updates the transmitted data information of the first storage based on the connection information read by the connection information reading portion before the connection information reading portion starts reading the connection information of the second packet.

3. The apparatus of claim 2, further comprising:

a data reading holding portion and a header generation holding portion, wherein the data reading holding portion holds the data reading portion from reading data of the second packet until the data reading portion completes reading the data of the first packet and until the header generating portion completes generation of the header of the first packet, and cancels holding the data reading portion from reading the data of the second packet after the data reading portion completes reading the data of the first packet and after the header generating portion completes generation of the header of the first packet, wherein the data reading portion reads the data when the data reading holding portion cancels the holding, wherein the header generation holding portion holds the header generating portion from generating a header of the second packet until the data reading portion completes reading the data of the first packet and until the header generating portion completes generation of the header of the first packet, and cancels holding the header generating portion from generating the header of the second packet after the data reading portion completes reading the data of the first packet and after the header generating portion completes generation of the header of the first packet, and wherein the header generating portion generates the header when the header generation holding portion cancels the holding.

4. The apparatus of claim 3, further comprising:

a packet generating portion which includes a checksum processing portion, a packet buffer portion and a packet output portion, wherein the checksum processing portion calculates a checksum value from a header of a packet generated by the header generating portion and data of the packet read by the data reading portion, wherein the packet buffer portion buffers the header of the packet generated by the header generating portion and the data of the packet read by the data reading portion, wherein the packet output portion is constituted by a third hardware module which is operable in parallel with each of the first hardware module and the second hardware module, and the packet output portion stores a checksum value calculated from a header and data, which have been buffered previously to the header and the data which will be buffered by the packet buffer portion, into the previously buffered header and data by the checksum processing portion in parallel with the buffering performed by the packet buffer portion and outputs the header and data as a packet, and wherein the header generating portion and the data reading portion perform data reading and header generation of a packet which will be transmitted next to the header and data buffered by the packet buffer portion after the packet output portion completes output of the header and data previously buffered by the packet buffer portion as a packet.

5. The apparatus of claim 4, further comprising:

a transmission start instruction portion and a transmission start instruction holding portion, wherein the transmission start instruction portion issues a transmission start instruction for one packet to the connection information reading portion, wherein the transmission start instruction holding portion holds the transmission start instruction portion from issuing a transmission start instruction for another packet to be transmitted next to the one packet until the connection information writing portion completes writing connection information of the one packet, and cancels holding the transmission start instruction portion from issuing the transmission start instruction for the other packet to be transmitted next to the one packet after the connection information writing portion completes writing the connection information of the one packet.

6. The apparatus of claim 5, wherein the transmission start instruction holding portion holds the transmission start instruction portion from issuing the transmission start instruction for the other packet to be transmitted next to the one packet until the header generating portion completes generation of a header of the one packet, and cancels holding the transmission start instruction portion from issuing the transmission start instruction for the other packet to be transmitted next to the one packet after the header generating portion completes generation of the header of the one packet.

7. The apparatus of claim 6, further comprising:

a transmission permission/rejection determining portion, wherein the connection information further includes information for determining whether a packet is allowed to be transmitted or not in accordance with each connection, wherein the transmission permission/rejection determining portion determines whether a packet corresponding to the connection information read by the connection information reading portion is allowed to be transmitted or not, based on the connection information, and wherein the transmission permission/rejection determining portion terminates processing for transmitting the packet when transmission of the packet is determined as rejected, and allows the transmission start instruction portion to issue a transmission start instruction for transmitting a next packet to the packet.

\* \* \* \* \*